(12) United States Patent
Song

(10) Patent No.: US 11,925,181 B1
(45) Date of Patent: Mar. 12, 2024

(54) MAKING METHOD OF HYPOGLYCEMIC MEAL REPLACEMENT BREAD

(71) Applicant: Zhejiang Wanli University, Ningbo (CN)

(72) Inventor: Chunbo Song, Ningbo (CN)

(73) Assignee: Zhejiang Wanli University, Ningbo (CN)

( * ) Notice: Subject to any disclaimer, the term of this patent is extended or adjusted under 35 U.S.C. 154(b) by 0 days.

(21) Appl. No.: 17/974,642

(22) Filed: Oct. 27, 2022

(30) Foreign Application Priority Data

Oct. 9, 2022 (CN) .......................... 202211225534.5

(51) Int. Cl.
*A21D 2/18* (2006.01)
*A21D 8/04* (2006.01)

(52) U.S. Cl.
CPC .............. *A21D 2/181* (2013.01); *A21D 8/047* (2013.01)

(58) Field of Classification Search
None
See application file for complete search history.

(56) References Cited

FOREIGN PATENT DOCUMENTS

CN 105941540 A * 9/2016 ............. A21D 13/00

OTHER PUBLICATIONS

Machine translation, CN 105941540, Publication date Sep. 2016, pp. 1-4. (Year: 2016).*
Wartenburg, "What is black fungus, and does it have benefits?". Available online from healthline.com as of Nov. 11, 2019. pp. 1-8. (Year: 2019).*
MarcAurele, "Keto cream cheese bread recipe". Available online from https://lowcarbyum.com as of Jul. 15, 2020, pp. 1-16. (Year: 2020).*
J Complement Integr Med, "Hericium erinaceus: an edible mushroom with medicinal values". May 24, 2013, p. 1, abstract. (Year: 2013).*
Lawler, "8 whole grains that can help prevent or manage type 2 diabetes". Available online from everydayhealth.com as of Oct. 29, 2020. pp. 1-14. (Year: 2020).*

* cited by examiner

*Primary Examiner* — Jenna A Watts
(74) *Attorney, Agent, or Firm* — Zhigang Ma

(57) ABSTRACT

A making method of meal replacement bread is provided, which is based on hypoglycemic function of black fungus polysaccharide and yam polysaccharide, and uses α-amylase inhibition rate as a measurement index. Five single-factor experiments are designed with an addition of composite polysaccharide, buckwheat flour, butter, cream cheese and milk respectively, to screen out the best addition of each nutrient and provide a making recipe of the hypoglycemic meal replacement bread with high nutrition.

4 Claims, 3 Drawing Sheets

MAKING METHOD OF HYPOGLYCEMIC MEAL REPLACEMENT BREAD

TECHNICAL FIELD

The disclosure relates to a field of food industry, in particular to a making method of meal replacement bread.

BACKGROUND

Along with a continuous popularization of healthy living concept, people pursuit a well-eating diet from the enough-eating diet. Along with pursuing a healthy life in the busy work, snack style and meal replacement gradually become a more favorable choice to young people. The emergence of the meal replacement food is inevitable, the meal replacement food not only gives human body enough to maintain the calories needed for daily life, but also is rich in high fiber, easy to satiate, easy to save, portable and low calorie, and therefore, the meal replacement food is popular in the majority of consumers. A research study of market development of the meal replacement food finds that meal replacement bread is one of the main meal replacement foods chosen by the public. The functional meal replacement bread improves the diet structure of high blood sugar and high blood fat caused by excess fat, oil and sugar, and solves dietary problems of special people. At present, there is a huge demand for the meal replacement food in China, and the market is not yet fully saturated. Therefore, the study of how to make a convenient meal replacement food with high nutrition and health benefits has become the most worthy topic of discussion nowadays, and is also a challenge and problem that the meal replacement food market currently faces. Functional meal replacement bread is not fully developed among the public, most of the meal replacement bread is designed for satiety, lack of rich nutrients, and hypoglycemic function is not obvious. Therefore, it is imperative to develop the meal replacement bread with efficient hypoglycemic and high nutrition.

SUMMARY

Based on hypoglycemic functions of black fungus polysaccharide and yam polysaccharide, the disclosure provides a making recipe of hypoglycemic meal replacement bread with high nutrition.

In order to achieve the above purposes, the disclosure provides the making recipe of meal replacement bread as follows:
high gluten flour with 35% to 40% parts by mass; egg wash with 7% to 9% parts by mass; yeast with 0.6% to 0.8% parts by mass; water with 10% to 14% parts by mass; black fungus polysaccharide with 0.24% to 0.3% parts by mass; yam polysaccharide with 0.12% to 0.15% parts by mass; buckwheat flour with 15% to 20% parts by mass; butter with 2% to 3% parts by mass; cream cheese with 8% to 10% parts by mass; and milk with 10% to 15% parts by mass.

In an illustrated embodiment, a mass ratio of the black fungus polysaccharide: the yam polysaccharide addition is 2:1.

The beneficial effect of the disclosure is that the black fungus polysaccharide of the making recipe of hypoglycemic meal replacement bread has obvious functions of increasing immunity, anti-thrombotic, lowering blood lipids, lowering blood sugar, alleviating atherosclerosis, anti-inflammatory, anti-radiation, anti-cancer, etc.; the yam polysaccharide has hypoglycemic effect, and improves human immunity. And α-amylase and α-glucosidase are key enzymes related to starch digestion of human dietary. The α-amylase produced in salivary glands and pancreas hydrolyzes the starch into disaccharides (such as sucrose, maltose and lactose) and oligosaccharides from mouth to small intestine. The disaccharides and oligosaccharides are further hydrolyzed into glucose for intestinal absorption by α-glucosidase located at brush border of the small intestine. Inhibition of α-amylase activity can effectively reduce the rate of starch hydrolysis and thus can control postprandial hyperglycemia. Based on the hypoglycemic function of the black fungus polysaccharide and the yam polysaccharide, the α-amylase inhibition rate is regarded as a measurement index, hypoglycemic meal replacement bread with high nutrition is developed by adding a certain ratio of polysaccharide compounds.

DETAILED DESCRIPTION OF EMBODIMENTS

Embodiment 1

A making process of hypoglycemic meal replacement bread: preparing ingredients and an apparatus; weighing 25 grains (g) of high gluten flour, 3.5 g of egg wash, 0.3 g of yeast and 10 g of water; dissolving the yeast in the 10 g of water pre-chilled to 37° C. (an optimum temperature for the yeast to ferment) to obtain mixed solution; pouring the egg wash and the mixed solution into the high gluten flour to obtain dough after mixing well; kneading the dough until that the dough no longer sticks to hands (about 2-3 minutes (min)); fermenting the dough for 30 min at 37° C.; checking whether the dough is fully fermented by gently pressing the dough with a finger; the dough being done when a depressed area is no longer raised; putting the fermented dough into an oven, setting heat of an upper heat pipe at 150° C., and heat of a lower heat pipe at 110° C.; and baking for about 30 min to obtain the meal replacement bread.

Embodiment 2

Determination of α-amylase inhibition rate

An appropriate amount of the meal replacement bread is taken to grind in liquid nitrogen to obtain a sample; the sample is dissolved in water to obtain sample solution; 100 microliters (μL) of 0.5 milligram/milliliter (mg/mL) (referring to concentration of solution) sample solution and 50 μL of 1 U/mL (referring to active unit of enzymes) α-amylase are added on a 96-hole plate (referring to a cell culture plate) to mix well in a water bath for 10 min at 37° C.; 50 μL of 0.2% starch solution is added in the water bath for 10 min at 37° C.; 100 μL of color rendering agent (referring to 5 mmol/L iodine and 5 mmol/L potassium iodine dissolved in 1 mol/L hydrochloric acid) is added to the sample solution and terminate reaction after high-speed shaking and mixing; an absorbance A1 is measured at 620 nanometers (nm); an equal amount of pH (referring to a value of acidity or alkalinity of a substance) 6.8 phosphate buffer solution is taken to replace the sample solution to measure an absorbance $A_0$; and then an absorbance $A_2$ of the reaction only with the sample solution is measured. A calculation is as follows:

$$\alpha\text{-amylase inhibition rate} = \frac{A_1 - A_0}{A_2} \times 100\%$$

Figure 1:
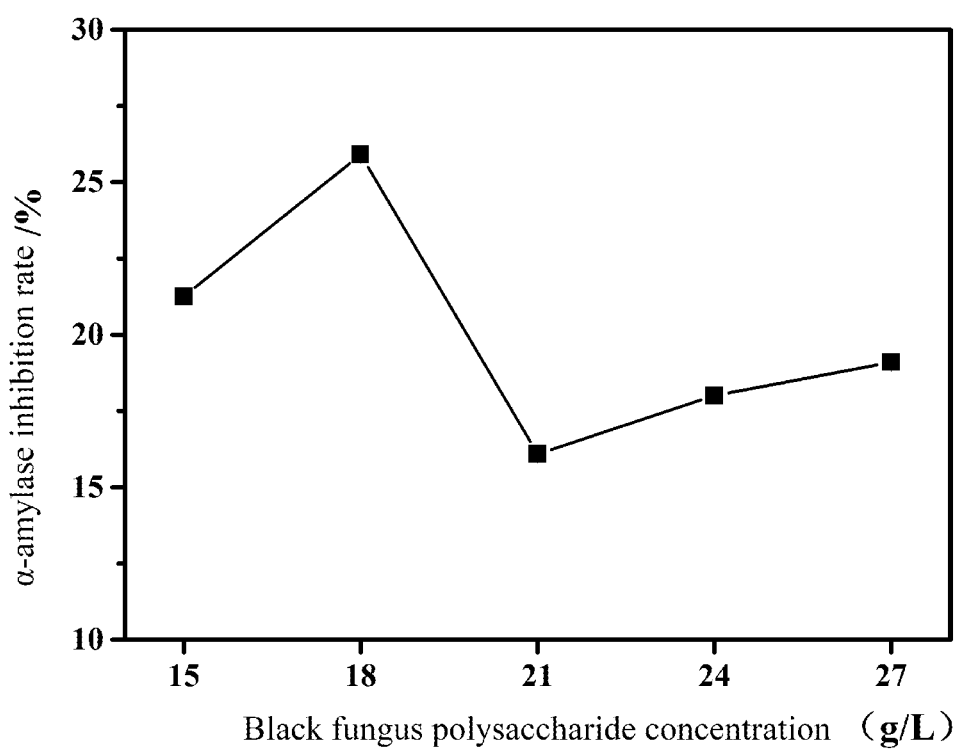
FIG. 1 is a schematic diagram of an effect of gradient of black fungus polysaccharide concentration on α-amylase inhibition rate according to an embodiment of the disclosure.
Figure 2:
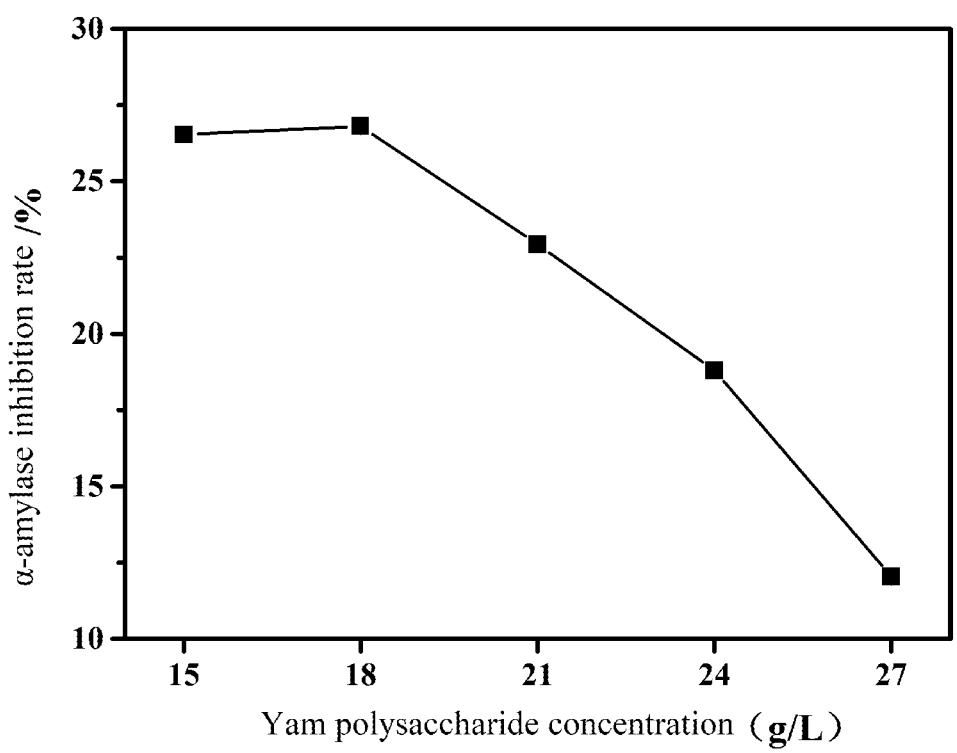
FIG. 2 is a schematic diagram of an effect of gradient of yam polysaccharide concentration on α-amylase inhibition rate according to an embodiment of the disclosure.
Figure 3:
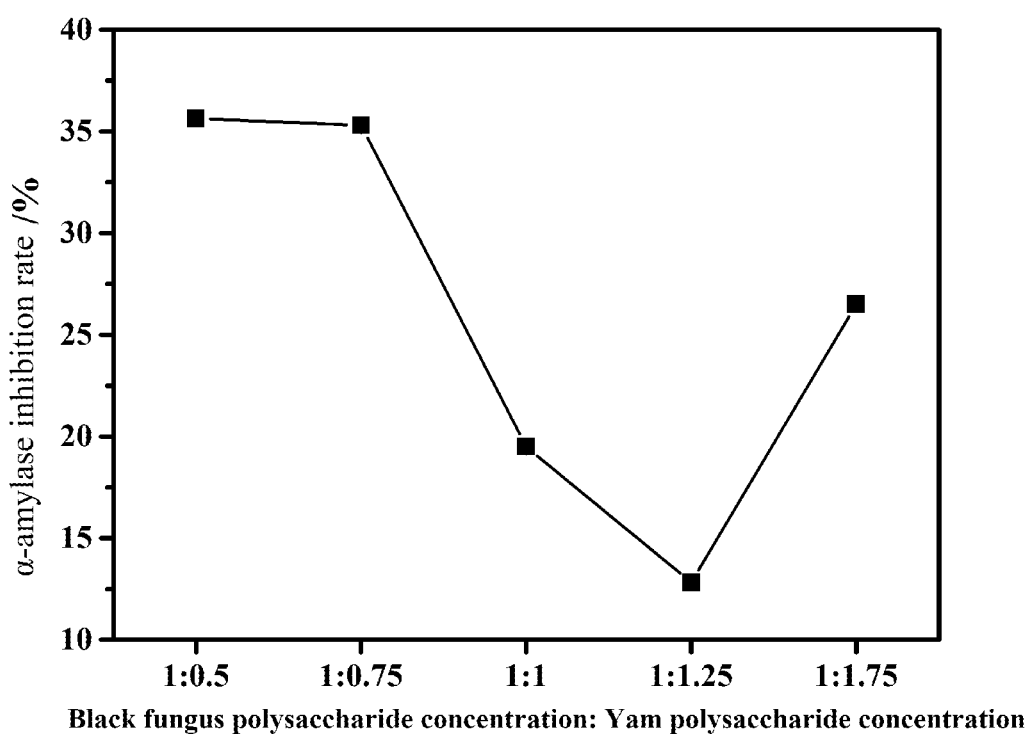
FIG. 3 is a schematic diagram of an effect of a concentration ratio of the black fungus polysaccharide to the yam polysaccharide on α-amylase inhibition rate according to an embodiment of the disclosure.

The α-amylase inhibition rate experiments are respectively done for an addition of the black fungus polysaccharide, an addition of the yam polysaccharide, and an addition ratio of the black fungus polysaccharide to the yam polysaccharide composite polysaccharide, and experiment results are shown in FIG. 1, FIG. 2 and FIG. 3.

As shown in FIG. 1, the α-amylase inhibition rate peaks at a concentration of 18 g/L of the black fungus polysaccharide, so 18 g/L is an optimal concentration of the black fungus polysaccharide.

As shown in FIG. 2, the α-amylase inhibition rate peaks at a concentration of 18 g/L of the yam polysaccharide, so 18 g/L is an optimal concentration of the yam polysaccharide.

As shown in FIG. 3, the α-amylase inhibition rate peaks at a ratio of the black fungus polysaccharide to the yam polysaccharide being 1:0.5 (equal to the ratio of 2:1), that is, the added amount of the black fungus polysaccharide is 0.12 g, and the added amount of the yam polysaccharide is 0.06 g.

What is claimed is:

1. Hypoglycemic meal replacement bread, wherein the hypoglycemic meal replacement bread: is made from raw materials in parts by mass as follows:

high gluten flour with 35% to 40% parts by mass; egg wash with 7% to 9% parts by mass; yeast with 0.6% to 0.8% parts by mass; water with 10% to 14% parts by mass; black fungus polysaccharide with 0.24% to 0.3% parts by mass; yam polysaccharide with 0.12% to 0.15% parts by mass; buckwheat flour with 15% to 20% parts by mass; butter with 2% to 3% parts by mass; cream cheese with 8% to 10% parts by mass; and milk with 10% to 15% parts by mass; wherein a mass ratio of the black fungus polysaccharide: the yam polysaccharide is 2:1 to thereby reach an α-amylase inhibition rate peak.

2. The hypoglycemic meal replacement bread as claimed in claim 1, wherein a concentration of the black fungus polysaccharide in solution of the hypoglycemic meal replacement bread is 18 g/L.

3. The hypoglycemic meal replacement bread as claimed in claim 1, wherein a concentration of the yam polysaccharide in solution of the hypoglycemic meal replacement bread is 18 g/L.

4. The hypoglycemic meal replacement bread as claimed in claim 1, wherein an added amount of the black fungus polysaccharide is 0.12 g, and an added amount of the yam polysaccharide is 0.06 g.

* * * * *